United States Patent [19]
Chew

[11] Patent Number: 5,107,491
[45] Date of Patent: Apr. 21, 1992

[54] COLLISION FILTER

[75] Inventor: Thomas Chew, San Francisco, Calif.

[73] Assignee: Advanced Micro Devices, Inc., Sunnyvale, Calif.

[21] Appl. No.: 481,891

[22] Filed: Feb. 20, 1990

[51] Int. Cl.$^5$ .............................................. H04J 3/02
[52] U.S. Cl. ................................ 370/85.3; 370/85.2; 340/825.5
[58] Field of Search .................. 370/85.2, 15, 94.1, 370/85.3; 340/554, 825.5; 323/354; 379/90

[56] References Cited

U.S. PATENT DOCUMENTS

| | | | |
|---|---|---|---|
| 3,813,669 | 5/1974 | Saunders | 340/554 |
| 4,438,298 | 3/1984 | Rubin | 379/90 |
| 4,534,024 | 8/1985 | Maxemchuk | 370/94.1 |
| 4,608,559 | 8/1986 | Friedman et al. | 370/85.3 |
| 4,611,320 | 9/1986 | Southard | 370/15 |
| 4,644,348 | 2/1987 | Gerety | 370/85.2 |
| 4,810,949 | 3/1989 | Schiemenz et al. | 323/354 |

Primary Examiner—Douglas W. Olms
Assistant Examiner—T. Samuel
Attorney, Agent, or Firm—Foley & Lardner

[57] ABSTRACT

There is disclosed a collision filter for use in a network to detect a fault condition wherein two or more nodes are simultaneously transmitting on the network. The fault condition is characterized by an increased average DC voltage level on the network. The collision filter includes a low pass filter stage having an input coupled to the network and an output and a notch filter having an input coupled to the low pass filter stage output. The notch filter has at least one attenuation notch at a desired frequency and an output for providing the increased average DC voltage level responsive to a fault condition.

20 Claims, 2 Drawing Sheets

COLLISION FILTER

BACKGROUND OF THE INVENTION

The present invention generally relates to an improved collision filter and more particularly to such a filter for use in a tap transceiver of an Ethernet-type LAN network.

Ethernet-type LAN networks are well known in the art. Such networks employ Manchester encoded data packets for conveying information from one node of the network to another node. Each node of the network generally includes a tap transceiver. The main function of a tap transceiver is to perform signal translation to the encoded signals and to detect a fault condition on the network which results when two or more nodes are simultaneously transmitting on the network. The last noted function is performed in the tap transceiver by a collision filter.

The Manchester encoded signals are digital signals with two discreet voltage levels, for example, zero (0) volts and minus two ($-2$) volts. Hence, when a node is transmitting, there is an average DC voltage level on the network of about minus one ($-1$) volt. When two nodes are simultaneously transmitting, the discreet signal levels can vary from zero (0) to minus four ($-4$) volts, resulting in an increase in the magnitude of the average DC voltage level on the network to about minus two ($-2$) volts. In order to detect a fault condition, it is therefore necessary to extract the average DC voltage level on the network while rejecting the AC components of the encoded signals.

To perform the required signal processing for detecting fault conditions, collision filters have taken the form of cascaded low pass filters. One known collision filter has employed three such cascaded low pass filters. These filters, by virtue of their attenuation characteristics, pass the DC levels while rejecting the AC components.

While the prior art cascaded low pass filters have been generally successful, there remains room for improvement in their operation. One problem has been that, due to the monotonic attenuation characteristics of each filter stage and hence, the monotonic characteristic of the overall filter, in order to attenuate the lower fundamental frequency of five (5) megahertz adequately, the higher frequency components, including the higher fundamental frequency component of ten (10) megahertz, have been overattenuated to the end of unduly decreasing the transient step response times of the filters.

Tap transceivers, including the collision filters, are generally implemented in integrated circuit form. When implemented in such form, it is necessary to take into account the process variations of the resistors and capacitors used in the prior art low pass filters. This has resulted in the overdesign of such filters to assure adequate attenuation of the five (5) megahertz lower fundamental frequency. This unfortunately has resulted in greater attenuation of the higher frequencies, including the higher fundamental frequency, than necessary, and hence, slower than optimum transient response times.

The present invention overcomes these design constraints by utilizing a single low pass filter stage followed by one or more notch filter stages. This results in adequate attenuation of the five (5) megahertz frequency component along with adequate, but not over attenuation, of the higher frequencies. What results is a collision filter having adequate attenuation for extracting the average DC voltage level on the network while also having improved transient response times.

SUMMARY OF THE INVENTION

The invention therefore provides a collision filter for use in a network to detect a fault condition wherein two or more nodes are simultaneously transmitting on the network and wherein the fault condition is characterized by an increased average DC voltage level on the network. The collision filter includes a low pass filter stage having an input coupled to the network and an output, and notch filter means having an input coupled to the low pass filter stage output. The notch filter means has at least one attenuation notch at a desired frequency and an output for providing the increased average DC voltage level responsive to a fault condition.

The present invention further provides a collision filter for use in a network to detect a fault condition wherein two or more nodes are simultaneously transmitting on the network and wherein the fault condition is characterized by an increased average DC voltage level on the network. The collision filter includes a low pass filter stage having an input coupled to the network and an output, a first notch filter having an input coupled to the low pass filter stage, wherein the first notch filter has an attenuation notch at a first frequency and an output, and a second notch filter having an input coupled to the first notch filter output. The second notch filter has an attenuation notch at a second frequency different than the first frequency and an output for providing the increased average DC voltage level responsive to a fault condition.

BRIEF DESCRIPTION OF THE DRAWINGS

The features of the present invention which are believed to be novel are set forth with particularity in the appended claims. The invention, together with further advantages and objects thereof, may best be understood by making reference to the following description in conjunction with the accompanying drawings, in the several figures of which like reference numerals identify identical elements, and wherein:

DESCRIPTION OF THE PREFERRED EMBODIMENT

Figure 1:
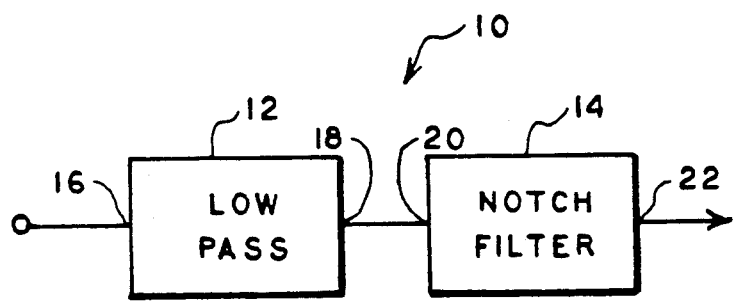
FIG. 1 is a schematic block diagram of a first collision filter embodying the present invention.

Referring now to FIG. 1, it illustrates a first collision filter 10 embodying the present invention. As previously mentioned, Manchester encoded data packets have two fundamental frequency components, a lower fundamental frequency component at 5 MHz, and a higher fundamental frequency component at 10 MHz. As also previously mentioned, conventional low pass filters have employed a plurality of cascaded low pass filter stages designed for maximum attenuation of the lower frequency component which also attenuate all of the higher frequencies to the detriment of the transient response times of the collision filters.

In contrast to the prior art, the collision filter 10 of FIG. 1 includes a single low pass filter stage 12 and a notch filter stage 14. The low pass filter stage 12 includes an input 16 adapted for connection to the network (not shown) and an output 18. The output 18 of low pas filter stage 12 is coupled to the input 20 of the notch filter 14. The notch filter 14 includes an output 22 which provides the extracted average DC voltage level. When a fault condition exists on the network, the output 22 coupled to a threshold circuit (not shown) detects the presence of the increased average DC voltage level.

In accordance with this embodiment of the present invention, the low pass filter stage 12 may be a conventional low pass filter of the type well known in the art which provides a monotonic attenuation characteristic. The notch filter 14 preferably includes a single attenuation notch at the 5 MHz lower fundamental frequency of the Manchester encoded data packet. Hence, the first stage 12 provides an initial low pass characteristic similar to the first stages provided in prior art collision filters, but the notch filter 14 provides a high attenuation at the specific frequency of 5 MHz. The end result is a collision filter which provides adequate attenuation at the 5 MHz lower fundamental frequency and adequate attenuation of the higher frequencies without overattenuating the higher frequencies. As a result, collision filter 10 is capable of extracting the average DC voltage level on the network while exhibiting improved transient response times.

Figure 2:
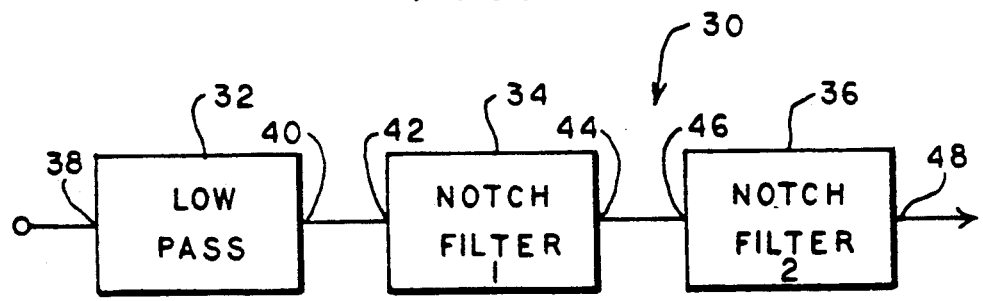
FIG. 2 is a schematic block diagram of a another collision filter embodying the present invention.

Referring now to FIG. 2, it illustrates another collision filter 30 embodying the present invention which may be more readily implemented in integrated circuit form. The collision filter 30 includes a low pass filter stage 32, a first notch filter 34, and a second notch filter 36. The low pas filter stage 32 includes a input 38 adapted to be coupled to a network (not shown). The low pass filter stage 32 includes an output 40 which is coupled to the input 42 of the notch filter stage 34. The notch filter stage 34 includes an output 44 coupled to the input 46 of notch filter stage 36. Lastly, the notch filter stage 36 has an output 48 for providing the increased average DC voltage level responsive to a fault condition on the network.

The low pass filter stage 32 again may be a low pass filter of the type well known in the art which provides a monotonic attenuation characteristic. This stage provides an initial low pass characteristic as mentioned above with respect to low pass filter stage 12 of collision filter 10.

When precision resistor and capacitor components are available, a single notch filter stage as shown in FIG. 1 may be utilized in practicing the present invention. However, since practical implementation using integrated circuit technology and resistor and capacitor components involve process variations, the collision circuit 30 includes a pair of notch filter stages 34 and 36. The pair of notch filter stages 34 and 36 are provided because integrated circuit manufacturing process variations in forming resistors and capacitors would cause the attenuation notch frequencies to shift away from the ideal attenuation notch frequencies. In order to compensate for these processing variations, the attenuation notches of notch filter stages 34 and 36 are preferably spaced apart. Preferably, the attenuation notch frequency of notch filter 34 is below the 5 MHz lower fundamental frequency of the Manchester encoded data packet and the attenuation notch filter frequency of notch filter 36 is above the 5 MHz lower fundamental frequency but below the 10 MHz higher fundamental frequency. For example, the notch frequencies of the notch filters can be set to plus or minus 20% of the desired reject frequency of, for example, 5 MHz. To that end, the notch filter frequency of notch filter 34 could be set at −20% of the reject frequency and the notch filter frequency of notch filter 36 could be set at +20% of the reject frequency.

With the desired reject frequency being between the notch frequencies of notch filters 34 and 36, component variations will not degrade the attenuation characteristics of the filter at the reject frequency. This results because process variations that would make the notch frequencies lower would move the notch frequency of notch filter 36 toward the reject frequency and conversely, the process variations that would make the notch frequencies go higher in frequency would move the notch frequency of notch filter 34 towards the desired reject frequency. In either case, there would be an improvement in the overall attenuation of the filter.

Figure 3:
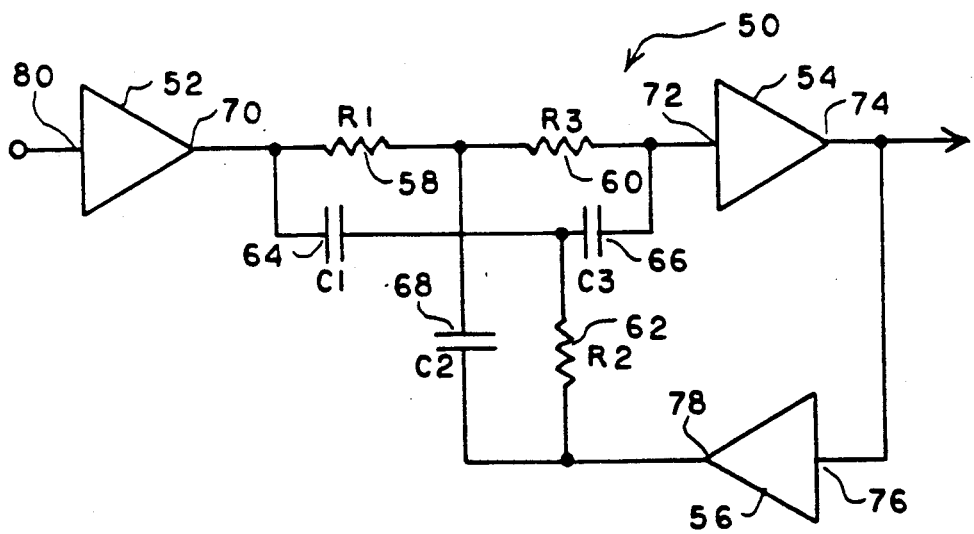
FIG. 3 is a schematic circuit diagram of a notch filter which may be utilized in practicing the present invention.

Referring now to FIG. 3, it illustrates a schematic circuit diagram of a notch filter which may be utilized in practicing the present invention. This type of notch filter is referred to in the art as a Twin-Tee notch filter which is compatible with integrated circuit design constraints. The notch filter 50 includes a buffer 52, a first unity gain amplifier 54, a second unity gain amplifier 56, a plurality of resistors 58, 60 and 62, and a like plurality of capacitors 64, 66, and 68. The output 70 of buffer 52 is coupled to the input 72 of amplifier 54 by resistors 58 and 60. Coupled across resistors 58 and 60 are capacitors 64 and 66. The output 74 of amplifier 54 is coupled to the input 76 of amplifier 56. The capacitor 68 is coupled between the output 78 of amplifier 56 and the common junction of resistors 58 and 60. Lastly, resistor 62 is coupled between the common junction of capacitors 64 and 66 and the output 78 of amplifier 56.

The output 74 of amplifier 54 comprises the output of the notch filter. The input 80 of buffer 52 comprises the input to the notch filter.

As will be appreciated by those skilled in the art, Twin-Tee notch filter 50 of FIG. 3 provides an attenuation notch frequency as expressed below:

$$f_{notch} = \left(\frac{1}{2\pi}\right)\left(\frac{C_1 + C_3}{C_1 \cdot C_2 \cdot C_3 \cdot R_1 \cdot R_3}\right)^{\frac{1}{2}}$$

Figure 4:
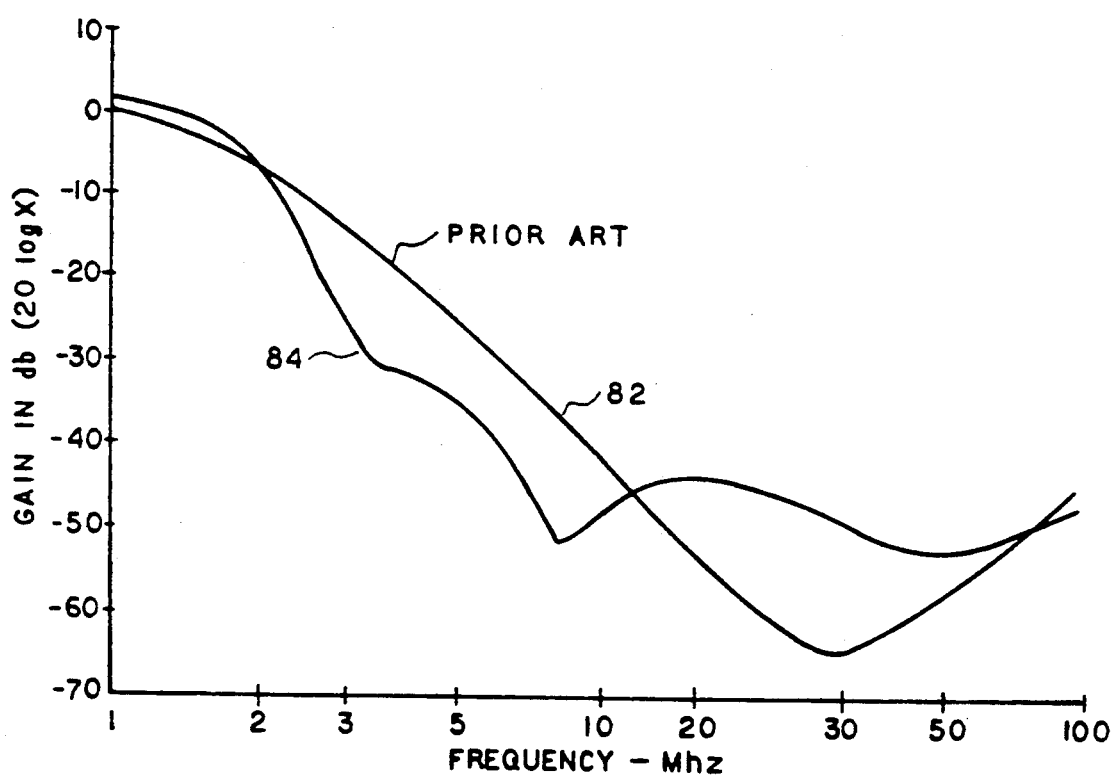
FIG. 4 is a graph comparing the attenuation versus frequency characteristics of a prior art collision filter with a collision filter implemented in accordance with the embodiment of FIG. 2.

The above expression for the attenuation notch at the noted frequency can be simplified for design implementations when the following constraints are imposed:

Conditions:
$R_1 = R_3 = 2R_2$
$C_1 = C_3 = \frac{1}{2}C_2$
$R_1 C_1 = R_2 C_2 = R_3 C_3$ Referring now to FIG. 4, it compares the attenuation characteristics of a prior art collision filter with the collision filter embodying the present invention as illustrated in FIG. 2. As can be seen in FIG. 4, the prior art collision filter characteristic 82 is monotonic and exhibits an attenuation of about −25 db at 5 MHz and an increased attenuation from 10 MHz to 30 MHz. In contrast, the filter characteristic 84 of the collision filter illustrated in FIG. 2 has a greater attenuation at 5 MHz but less attenuation above 10 MHz. The filter characteristic 84 corresponds to a collision filter as shown in FIG. 2 wherein the attenuation notch filter frequency of notch filter 34 has been set at 3.3 MHz and the attenuation notch filter frequency of notch filter 36 has been set at 7.1 MHz.

From FIG. 4, it can therefore be seen that the collision filter of the present invention exhibits increased attenuation at the 5 MHz lower fundamental frequency as compared to the prior art collision filter but decreased attenuation above 10 MHz as compared to the prior art collision filter. As a result, the collision filter of the present invention provides more than adequate attenuation at the 5 MHz lower fundamental frequency but exhibits improved transient response times because of the lesser attenuation above 10 MHz as compared to the prior art collision filter. As a result, the collision filter of the present invention is capable of extracting the average DC voltage level on the network while providing improved transient response times.

While particular embodiments of the present invention have been shown and described, modifications may be made, and it is therefore intended to cover in the appended claims all such changes and modifications which fall within the true spirit and scope of the invention.

What is claimed is:

1. A collision filter for use in a network to detect a fault condition wherein two or more nodes are simultaneously transmitting on said network, said fault condition causing an increased average DC voltage level on said network, said collision filter comprising:
   a low pass filter stage having an input coupled to said network and an output; and
   notch filter means having an input coupled to said low pass filter stage output, said notch filter means having at least one attenuation notch at a desired frequency and an output for providing said increased average DC voltage level responsive to a fault condition.

2. A collision filter as defined in claim 1 wherein said low pass filter stage has a monotonic attenuation characteristic.

3. A collision filter as defined in claim 1 wherein said transmissions on said network include a low fundamental frequency component and a high fundamental frequency component, and wherein said at least one attenuation notch is at the frequency of said low fundamental frequency component.

4. A collision filter as defined in claim 1 wherein said notch filter means comprises a first notch filter and a second notch filter.

5. A collision filter as defined in claim 4 wherein said first and second notch filters are cascaded.

6. A collision filter as defined in claim 5 wherein said first notch filter has an input coupled to said low pass filter stage output and an output, and wherein said second notch filter has an input coupled to said first notch filter output and an output for providing said increased average DC voltage level responsive to a fault condition.

7. A collision filter as defined in claim 6 wherein said first notch filter has an attenuation notch at a first frequency and wherein said second notch filter has an attenuation notch at a second frequency, said second frequency being different than said first frequency.

8. A collision filter as defined in claim 7 wherein said transmissions on said network are characterized by a low fundamental frequency and wherein said first frequency is below said low fundamental frequency and wherein said second frequency is above said low fundamental frequency.

9. A collision filter as defined in claim 8 wherein said first frequency is below said low fundamental frequency by about twenty percent.

10. A collision filter as defined in claim 8 wherein said second frequency is above said low fundamental frequency by about twenty percent.

11. A collision filter as defined in claim 8 wherein said low fundamental frequency is about 5 MHz, wherein said first frequency is about 3.3 MHz, and wherein said second frequency is about 7.1 MHz.

12. A collision filter as defined in claim 7 wherein said transmissions on said network are characterized by a low fundamental frequency and a high fundamental frequency, wherein said first frequency is below said low fundamental frequency, and wherein said second frequency is above said low fundamental frequency and below said high fundamental frequency.

13. A collision filter as defined in claim 1 wherein said notch filter means comprises a twin-tee notch filter.

14. A collision filter as defined in claim 4 wherein said first and second notch filters are twin-tee notch filters.

15. A collision filter for use in a network to detect a fault condition wherein two or more nodes are simultaneously transmitting on said network, said fault condition causing an increased average DC voltage level on said network, said collision filter comprising:
   a low pass filter stage having an input coupled to said network and an output;
   a first notch filter having an input coupled to said low pass filter stage output, an attenuation notch at a first frequency, and an output; and
   a second notch filter having an input coupled to said first notch filter output, an attenuation notch at a second frequency different than said first frequency, and an output for providing said increased average DC voltage level responsive to a fault condition.

16. A collision filter as defined in claim 15 wherein said low pass filter stage has a monotonic attenuation characteristic.

17. A collision filter as defined in claim 15 wherein said transmissions on said network are characterized by a low fundamental frequency and a high fundamental frequency, wherein said first frequency is below said low fundamental frequency, and wherein said second frequency is above said low fundamental frequency and below said high fundamental frequency.

18. A collision filter as defined in claim 17 wherein said low fundamental frequency is about 5 MHz, wherein said first frequency is about 3.3 MHz, and wherein said second frequency is about 7.1 MHz.

19. A collision filter as defined in claim 15 wherein each said first and second notch filters is a twin-tee notch filter.

20. A collision filter as defined in claim 19 wherein said low pass filter stage, said first notch filter, and said second notch filter are formed in an integrated circuit.

* * * * *